(12) United States Patent
Tani et al.

(10) Patent No.: US 11,063,659 B2
(45) Date of Patent: Jul. 13, 2021

(54) CONTROL STATION, SATELLITE STATION, EARTH STATION, DATA TRANSMISSION SYSTEM, AND DATA TRANSMISSION METHOD

(71) Applicant: MITSUBISHI ELECTRIC CORPORATION, Tokyo (JP)

(72) Inventors: Shigenori Tani, Tokyo (JP); Katsuyuki Motoyoshi, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 159 days.

(21) Appl. No.: 16/478,897

(22) PCT Filed: Feb. 2, 2017

(86) PCT No.: PCT/JP2017/003795
§ 371 (c)(1),
(2) Date: Jul. 18, 2019

(87) PCT Pub. No.: WO2018/142539
PCT Pub. Date: Aug. 9, 2018

(65) Prior Publication Data
US 2021/0135747 A1    May 6, 2021

(51) Int. Cl.
*H04B 7/185*    (2006.01)
*H04B 7/155*    (2006.01)

(52) U.S. Cl.
CPC ......... *H04B 7/18517* (2013.01); *H04B 7/155* (2013.01); *H04B 7/18523* (2013.01); *H04B 7/18539* (2013.01)

(58) Field of Classification Search
CPC .................. H04B 7/185–195; H04B 7/155
See application file for complete search history.

(56) References Cited

U.S. PATENT DOCUMENTS 6,567,645 B1 *  5/2003  Wiedeman ......... H04B 7/18534
                                                     455/12.1
6,985,454 B1    1/2006  Wiedeman et al.
(Continued)

FOREIGN PATENT DOCUMENTS

EP    0 722 228 A2    7/1996
JP    2000-224237 A   8/2000

OTHER PUBLICATIONS

ETSI EN 302 307-1 V1.4.1 (European Telecommunication Standerds Institute European Standard), Nov. 2014, pp. 1-80.
(Continued)

*Primary Examiner* — Raymond S Dean
(74) *Attorney, Agent, or Firm* — Birch, Stewart, Kolasch & Birch, LLP

(57) ABSTRACT

A control station includes: a location managing unit that calculates communicable times for combinations of a satellite station and an earth station that can perform communication with each other, based on a location of a satellite station and locations of earth stations serving as candidates to which the satellite station transmits the data; a data managing unit that holds information on a retention state of the data in the satellite having generated the data; and a transmission predicting unit that calculates data transmission completion times for one or more transmission paths from the satellite station to the earth station, based on the communicable times and the information on a retention state of the data, and generates control information for satellite stations and the earth station in a transmission path determined based on the data transmission completion times, to transmit the data in the determined transmission path.

15 Claims, 8 Drawing Sheets

(56) References Cited

U.S. PATENT DOCUMENTS

| | | | | |
|---|---|---|---|---|
| 2004/0087271 A1* | 5/2004 | Chang | ............ | H01Q 1/288 |
| | | | | 455/13.3 |
| 2004/0127158 A1* | 7/2004 | Dai | ............ | H04B 7/18513 |
| | | | | 455/12.1 |
| 2010/0315949 A1 | 12/2010 | Agarwal | | |
| 2016/0276747 A1* | 9/2016 | Davis | ............ | H01Q 19/062 |

OTHER PUBLICATIONS

Office Action issued in corresponding Canadian Application No. 3,051,656 dated Aug. 19, 2019.

* cited by examiner (a) LOCATION RELATIONSHIP BETWEEN SATELLITE STATIONS AND EARTH STATIONS AT t1

(b) LOCATION RELATIONSHIP BETWEEN SATELLITE STATIONS AND EARTH STATIONS AT t2

(c) LOCATION RELATIONSHIP BETWEEN SATELLITE STATIONS AND EARTH STATIONS AT t3

CONTROL STATION, SATELLITE STATION, EARTH STATION, DATA TRANSMISSION SYSTEM, AND DATA TRANSMISSION METHOD

FIELD

The present invention relates to a control station that controls a satellite station that transmits data to an earth station, a satellite station, an earth station, a data transmission system, and a data transmission method.

BACKGROUND

A data transmission system is introduced in which an artificial satellite such as an observation satellite that operates in orbit around the Earth in space transmits obtained data to an earth station on the Earth. In recent years, with an increase in the accuracy of an observation device mounted on an observation satellite, the amount of data transmitted by the observation satellite has increased. Hence, in order to transmit data at a higher speed than ever before, a data transmission system using the 26 GHz band, etc., that allows to use a wide frequency band is considered. In addition, in order to promptly grasp conditions on the Earth when disasters, etc., occur, a system is considered that monitors an arbitrary location using a plurality of observation satellites present at different orbital locations. An artificial satellite is hereinafter abbreviated as satellite.

Methods for transmitting data from a satellite to an earth station include a method in which data is transmitted directly from a satellite to an earth station, a method in which data is transmitted from a satellite to an earth station through a data relay satellite located in geostationary orbit, a method in which data is transmitted to an earth station through a plurality of satellites orbiting in a lower orbit than geostationary orbit, etc. In the direct transmission method, the distance between a satellite and an earth station is short compared to the method through a data relay satellite, and thus, distance attenuation is very small, enabling high-speed transmission. In the method through a data relay satellite, a communicable time between a satellite and an earth station is long compared to the direct transmission method, and in principle, by disposing three data relay satellites in geostationary orbit, the entire Earth can be covered, and thus, it becomes possible to promptly transmit data. In the method in which data is transmitted to an earth station through satellites orbiting in a low orbit, it is possible to relay arbitrary two locations. Patent Literature 1 discloses a technique for transmitting data to a destination node by performing packet routing using a plurality of low-orbit satellites.

In addition, in all of the above-described methods, when a satellite transmits data to an earth station, signal attenuation occurs due to rain attenuation, etc. For measures against rain attenuation, there is adaptive modulation that changes the modulation scheme, coding rate, etc., of a transmit signal, according to the quality of a receive signal. Non Patent Literature 1 discloses techniques such as Adaptive Coding and Modulation (ACM) and Variable Coding and Modulation (VCM), as adaptive modulation schemes. In adaptive modulation, control is performed such that when the reception quality is low, modulation levels and coding rate are reduced, and when the reception quality is high, modulation levels and coding rate are increased, by which it becomes possible to perform data transmission and reception that satisfy a desired error rate.

CITATION LIST

Patent Literature

Patent Literature 1: Japanese Patent Application Laid-open No. 2000-224237

Non Patent Literature

Non Patent Literature 1: ETSI TS (European Telecommunications Standards Institute Technical Specification) 302 307-1 V1.4.1, November 2014

SUMMARY

Technical Problem

However, in the direct transmission method, since a satellite orbits the Earth, a communicable time between the satellite and a specific earth station, i.e., the time during which the angle of elevation is greater than or equal to a certain value, is limited. Hence, there is a problem that when data transmission cannot be completed within a communicable time, data cannot be transmitted until the next communicable time, causing transmission delay.

In addition, in the method through a data relay satellite, when the latitude of Japan is considered, regardless of wireless communication or optical communication, an earth station needs to track a low-orbit data relay satellite. Hence, there is a problem that the number of satellites that can perform simultaneous communication is limited to the number of tracking mechanisms. Although the earth station can temporally switch a satellite to track, since a certain capturing time is required to track another satellite again, data transmission efficiency decreases.

In addition, when a plurality of satellites are relayed as in Patent Literature 1, a communication path needs to be set appropriately such that a satellite passing through over an earth station relays data. In packet routing, each satellite needs to demodulate a packet with route information. Hence, there is a problem that delay occurs due to a demodulation process by the satellites. In addition, there is a problem that when, upon selecting a route for satellite-to-satellite communication, a satellite whose communicable time with an earth station is short is selected, data transmission cannot be completed.

The present invention is made in view of the above description, and an object of the present invention is to obtain a control station that enables data transmission with reduced delay time when a satellite station transmits data to an earth station.

Solution to Problem

To solve the above-described problems and attain the object, a control station of the present invention includes a location managing unit that calculates communicable times for combinations of a satellite station and an earth station that are capable of communicating with each other, based on a location of satellite station that transmits data to an earth station and locations of earth stations serving as candidates to which the satellite station transmits the data. In addition, the control station includes a data managing unit that holds information on a retention state of the data in the satellite station having generated the data. In addition, the control station includes a transmission predicting unit that calculates data transmission completion times for one or more transmission paths from the satellite station having generated the data to the earth station, based on the communicable times and the information on a retention state of the data, and generates control information for satellite stations and an earth station in a transmission path determined based on the data transmission completion times, to transmit the data in the determined transmission path.

Advantageous Effects of Invention

The control station according to the present invention provides an advantageous effect that when a satellite station transmits data to an earth station, the data can be transmitted with reduced delay time.

DESCRIPTION OF EMBODIMENTS

Control stations, satellite stations, earth stations, data transmission systems, and data transmission methods according to embodiments of the present invention will be described in detail below based on the drawings. Note that the invention is not limited to the embodiments.

First Embodiment

Figure 1:
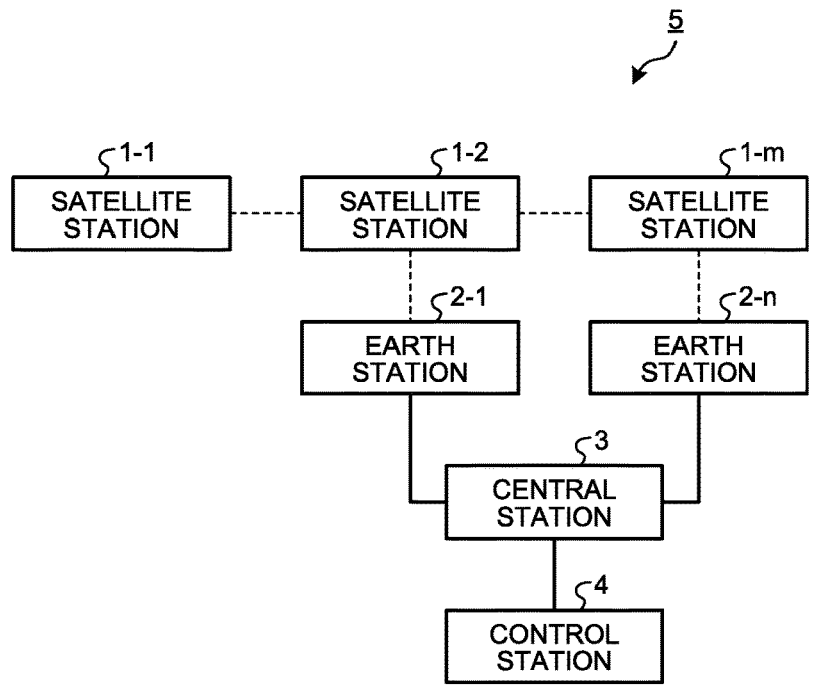
FIG. 1 is a diagram illustrating an exemplary configuration of a data transmission system according to a first embodiment.

FIG. 1 is a diagram illustrating an exemplary configuration of a data transmission system 5 according to a first embodiment of the present invention. The data transmission system 5 includes satellite stations 1-1 to 1-$m$, earth stations 2-1 to 2-$n$, a central station 3, and a control station 4. In the following description, the satellite stations 1-1 to 1-$m$ may be referred to as satellite stations 1 when not distinguished from each other, and the earth stations 2-1 to 2-$n$ may be referred to as earth stations 2 when not distinguished from each other. Although FIG. 1 illustrates three satellite stations as the satellite stations 1-1 to 1-$m$, the number of the satellite stations 1 is not limited thereto. In addition, although FIG. 1 illustrates two earth stations as the earth stations 2-1 to 2-$n$, the number of the earth stations 2 is not limited thereto. The "m" is an integer greater than or equal to two, and the "n" is an integer greater than or equal to one.

The satellite stations 1 are connected to each other by wireless lines, and the satellite stations 1 are connected to the earth stations 2 by wireless lines. In addition, the earth stations 2 are connected to the central station 3 by wired lines, and the central station 3 is connected to the control station 4 by a wired line. Note that for communication media for points connected by wireless lines, radio waves, light, etc., can be used, and the communication media may be any medium. Note also that points connected by wired lines may be connected by wireless lines.

Figure 2:
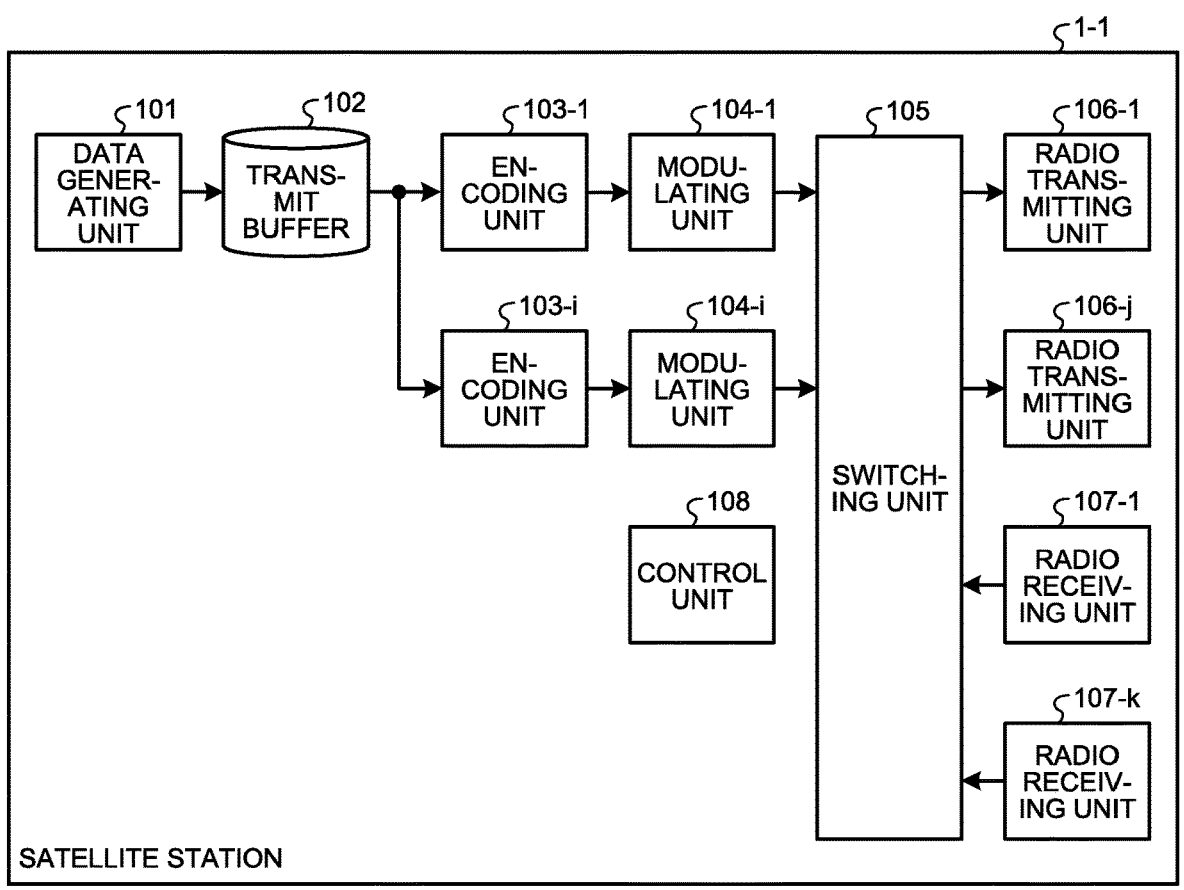
FIG. 2 is a block diagram illustrating an exemplary configuration of a satellite station according to the first embodiment.

The configuration and operation of the satellite station 1 will be described. FIG. 2 is a block diagram illustrating an exemplary configuration of the satellite station 1-1 according to the first embodiment. Since the satellite stations 1-1 to 1-$m$ have the same configuration, the satellite station 1-1 is described as an example. The satellite station 1-1 includes a data generating unit 101, a transmit buffer 102, encoding units 103-1 to 103-$i$, modulating units 104-1 to 104-$i$, a switching unit 105, radio transmitting units 106-1 to 106-$j$, radio receiving units 107-1 to 107-$k$, and a control unit 108. In the following description, the encoding units 103-1 to 103-$i$ may be referred to as encoding units 103 when not distinguished from each other, the modulating units 104-1 to 104-$i$ may be referred to as modulating units 104 when not distinguished from each other, the radio transmitting units 106-1 to 106-$j$ may be referred to as radio transmitting units 106 when not distinguished from each other, and the radio receiving units 107-1 to 107-$k$ may be referred to as radio receiving units 107 when not distinguished from each other.

Although FIG. 2 illustrates two encoding units as the encoding units 103-1 to 103-$i$, the number of the encoding units 103 is not limited thereto. In addition, although FIG. 2 illustrates two modulating units as the modulating units 104-1 to 104-$i$, the number of the modulating units 104 is not limited thereto. In addition, although FIG. 2 illustrates two radio transmitting units as the radio transmitting units 106-1 to 106-$j$, the number of the radio transmitting units 106 is not limited thereto. In addition, although FIG. 2 illustrates two radio receiving units as the radio receiving units 107-1 to 107-$k$, the number of the radio receiving units 107 is not limited thereto. The "i", "j", and "k" are integers greater than or equal to one.

The data generating unit 101 generates data, such as observed information, to be transmitted by the satellite station 1, i.e., transmit data. The data generating unit 101 may be, for example, an observation device or may be a processing circuit that obtains observed data from an observation device which is not illustrated, performs processes such as compression on the observed data, and thereby generates transmit data.

The transmit buffer 102 is a buffer that accumulates the data generated by the data generating unit 101, i.e., the transmit data.

Each encoding unit 103 encodes data read from the transmit buffer 102, i.e., the transmit data. Codes used in an encoding process by the encoding unit 103 include, for example, convolutional codes, Low Density Parity Check (LDPC) codes, and Reed Solomon (RS) codes, but the codes are not limited thereto.

Each modulating unit 104 modulates data encoded by a corresponding encoding unit 103. Modulation schemes of the modulating unit 104 include, for example, Quadrature Phase Shift Keying (QPSK) and Quadrature Amplitude Modulation (QAM), but the modulation schemes are not limited thereto.

The switching unit 105 receives the data modulated by the modulating units 104, or data received by the radio receiving units 107 which will be described later, and performs frequency conversion, transmission-path conversion, etc., on the received data, and outputs the data. The switching unit 105 controls the output destinations of the received data. The switching unit 105 may be composed of, for example, a switch that switches input ports and output ports by routing. In addition, the switching unit 105 may be configured to output data having an arbitrary frequency bandwidth, using a channelizer that divides received data into a plurality of frequency bands and then switches, i.e., rearranges, the divided pieces of data, and combines the rearranged pieces of data back together.

Each radio transmitting unit 106 includes an antenna whose pointing direction can be changed. The radio transmitting units 106 each convert data outputted from the switching unit 105 into a signal in a radio transmission frequency band, and further amplify the frequency-converted signal, and transmit the amplified signal as a radio signal to an earth station 2, another satellite station 1, or the like, through the antenna.

Each radio receiving unit 107 includes an antenna whose pointing direction can be changed. The radio receiving units 107 each receive a radio signal from an earth station 2, another satellite station 1, or the like, through the antenna, convert the received radio signal into data in a frequency band processable by the switching unit 105, and output the data. Note that in the following description, the "transmission of a radio signal from a satellite station 1 to an earth station 2" may be described represented as the "transmission of data from a satellite station 1 to an earth station 2". In addition, the "transmission and reception of radio signals between satellite stations 1" may be described represented as the "transmission and reception of data between satellite stations 1". In addition, the "reception of a radio signal by an earth station 2 from a satellite station 1" may be described represented as the "reception of data by an earth station 2 from a satellite station 1".

The control unit 108 receives control information from the control station 4, and controls the operation of each unit included in the satellite station 1, based on the received control information.

The control information includes information instructing about the pointing directions of the respective antennas included in the radio transmitting units 106 and the radio receiving units 107. In this case, the control unit 108 controls the pointing directions of the antennas included in the radio transmitting units 106 and the radio receiving units 107, according to the information on the pointing directions included in the control information received from the control station 4. In the radio transmitting units 106 and the radio receiving units 107, each antenna is pointed to, for example, any of a satellite in geostationary orbit which is not illustrated in FIG. 1, an earth station 2, and another satellite station 1.

In addition, the control information includes information indicating a transmission period including a data transmission start time, the amount of data read per unit time, i.e., a data read speed, an encoding scheme, and a modulation scheme. In this case, the control unit 108 instructs a corresponding encoding unit 103 about a start time at which data is read from the transmit buffer 102 and an encoding process starts, the data read speed, the encoding scheme, and a stop time at which the reading of the data is stopped and the encoding process is stopped, and instructs a corresponding modulating unit 104 about the modulation scheme, according to the information indicating a transmission period, a data read speed, an encoding scheme, and a modulation scheme which is included in the control information received from the control station 4.

In addition, the control information includes information on a data output destination in the switching unit 105, i.e., information for instructing from which radio transmitting unit 106 data inputted from a modulating unit 104 or a radio receiving unit 107 is to be outputted. In this case, the control unit 108 controls the data output destination in the switching unit 105, according to the information on an output destination included in the control information received from the control station 4. Note that instead of the control unit 108 controlling each unit based on all pieces of information included in the control information, the control unit 108 may perform control using at least one or more pieces of information.

Note that it is assumed that in the satellite station 1, pieces of modulated data outputted from the modulating units 104-1 to 104-$i$ are generated such that at least one or more of a data read period from the transmit buffer 102 by the encoding unit 103 which is based on a data transmission period, a data read speed from the transmit buffer 102 by the encoding unit 103, an encoding scheme, and a modulation scheme is different between the pieces of modulated data.

Now, a hardware configuration of the satellite station 1 will be described. Each unit illustrated in FIG. 2 can be implemented as hardware such as a single apparatus or circuit. In the satellite station 1, the data generating unit 101 is implemented by an observation device or a processing circuit that generates data. The transmit buffer 102 is implemented by a memory. The encoding units 103 are encoders. The modulating units 104 are modulators or modems. The switching unit 105 is a switch or a channelizer. The radio transmitting units 106 and the radio receiving units 107 each are implemented by a frequency converter circuit, an amplifier circuit, an antenna whose directivity can be changed, and the like. The control unit 108 is implemented by a processing circuit that controls each unit based on control information. The above-described units each may be formed as a single circuit or apparatus, or a plurality of functional parts may be formed as a single circuit or apparatus.

The data generating unit 101 which is a processing circuit that generates data, the encoding units 103, the modulating units 104, the switching unit 105, and the control unit 108 may be dedicated hardware, or may be a control circuit including a memory and a CPU (also referred to as a Central Processing Unit, a processing apparatus, an arithmetic unit, a microprocessor, a microcomputer, a processor, or a Digital Signal Processor (DSP)) that executes programs stored in the memory. Here, the memory corresponds, for example, to a nonvolatile or volatile semiconductor memory such as a Random Access Memory (RAM), a Read Only Memory (ROM), a flash memory, an Erasable Programmable Read Only Memory (EPROM), or an Electrically Erasable Programmable Read Only Memory (EEPROM) (registered trademark), a magnetic disk, a flexible disk, an optical disc, a compact disc, a MiniDisc, or a Digital Versatile Disk (DVD).

Figure 3:
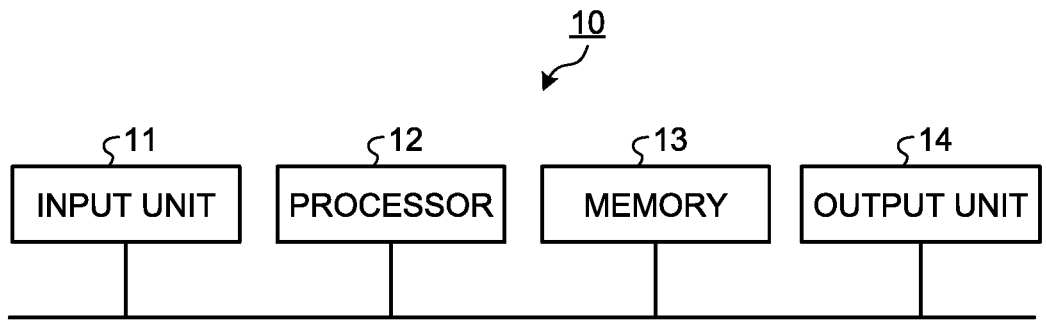
FIG. 3 is a diagram illustrating an example of a case in which a control circuit of the satellite station according to the first embodiment is implemented by using a CPU and a memory.

When the data generating unit 101 which is a processing circuit that generates data, the encoding units 103, the modulating units 104, the switching unit 105, and the control unit 108 are implemented by a control circuit which is a processing circuit including a CPU, the control circuit is, for example, a control circuit 10 having a configuration illustrated in FIG. 3. FIG. 3 is a diagram illustrating an example of a case in which the control circuit 10 of the satellite station 1 according to the first embodiment is implemented by using a CPU and a memory. As illustrated in FIG. 3, the control circuit 10 includes an input unit 11 which is a receiving unit that receives data inputted from an external source; a processor 12 which is a CPU; a memory 13; and an output unit 14 which is a transmitting unit that transmits data to an external source. The input unit 11 is an interface circuit that receives data inputted from a source external to the control circuit 10, and provides the data to the processor 12, and the output unit 14 is an interface circuit that transmits data from the processor 12 or the memory 13 to a source external to the control circuit 10. When the data generating unit 101 which is a processing circuit that generates data, the encoding units 103, the modulating units 104, the switching unit 105, and the control unit 108 are implemented by the control circuit 10 illustrated in FIG. 3, those units are implemented by the processor 12 reading and executing programs corresponding to processes for the respective units and stored in the memory 13. In addition, the memory 13 is also used as a temporary memory in each process performed by the processor 12.

When the data generating unit 101 which is a processing circuit that generates data, the encoding units 103, the modulating units 104, the switching unit 105, and the control unit 108 are implemented by dedicated hardware, those units are, for example, a single circuit, a combined circuit, a programmed processor, a parallel programmed processor, an Application Specific Integrated Circuit (ASIC), or a Field Programmable Gate Array (FPGA), or a combination thereof.

Figure 4:
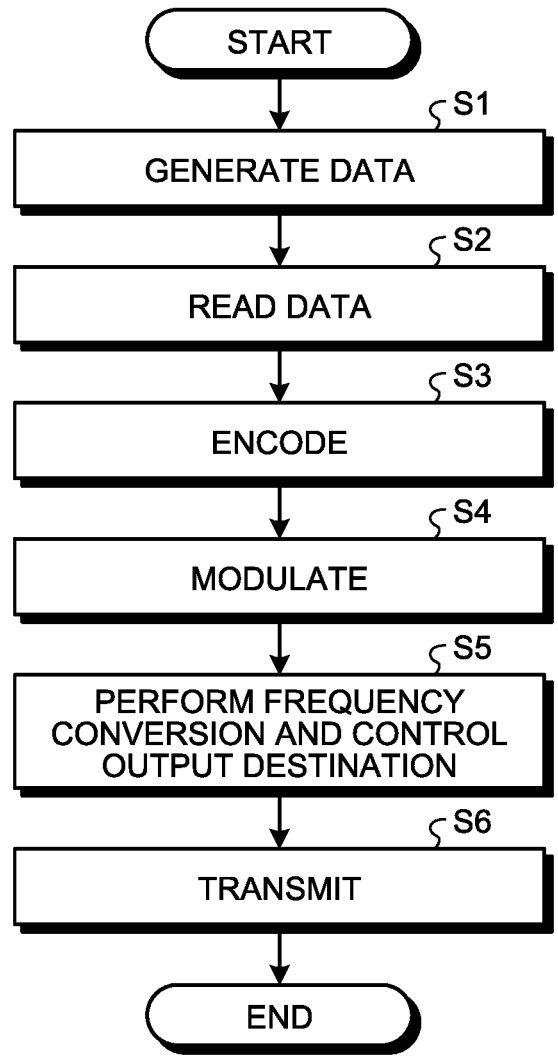
FIG. 4 is a flowchart illustrating the operation of the satellite station according to the first embodiment.

Next, the operation of the satellite station 1 will be described. FIG. 4 is a flowchart illustrating the operation of the satellite station 1 according to the first embodiment. In the satellite station 1, the data generating unit 101 generates data to be transmitted to an earth station 2 (step S1). As described above, when the data generating unit 101 itself is an observation device, the data generating unit 101 may use results observed by itself, as data or may generate data by obtaining observed data from an observation device which is not illustrated, and performing processes such as compression on the observed data. The data generating unit 101 stores the generated data in the transmit buffer 102. Note that a satellite station 1 having generated data is a first satellite station, and a satellite station 1 that relays data generated by another satellite station 1 is a second satellite station.

An encoding unit 103 reads data from the transmit buffer 102 during a data transmission period instructed by the control unit 108 and at an instructed data read speed (step S2).

The encoding unit 103 encodes the data read from the transmit buffer 102 by an encoding scheme instructed by the control unit 108 (step S3). The encoding scheme includes the type of coding and the coding rate. The type of coding indicates, for example, the type of code to be used such as convolutional codes or LDPC codes. For the encoding scheme, the control unit 108 may instruct the encoding unit 103 about the encoding scheme according to control information notified by the control station 4, or may change the encoding scheme using a predetermined change pattern and instruct the encoding unit 103 about the encoding scheme.

The control unit 108, for example, stores a plurality of encoding schemes in advance in an internal or external memory, and selects one of the plurality of encoding schemes according to a predetermined condition. In the case of direct transmission, the control unit 108 selects an encoding scheme based on the location of the satellite station 1 and the location of the earth station 2. Specifically, the control unit 108 selects an encoding scheme according to the angle of elevation of the earth station 2 pointed to the satellite station 1. For example, the control unit 108 uses a first encoding scheme when the angle of elevation is less than or equal to a first value, uses a second encoding scheme when the angle of elevation is greater than the first value and less than or equal to a second value, and uses a third encoding scheme when the angle of elevation is greater than the second value. Note that the second value >the first value.

A corresponding modulating unit 104 modulates the encoded data which is outputted from the encoding unit 103 by a modulation scheme instructed by the control unit 108 (step S4). As with the above-described encoding scheme of the encoding unit 103, the control unit 108 may instruct the modulating unit 104 about the modulation scheme according to control information notified by the control station 4, or may change the modulation scheme using a predetermined change pattern and instruct the modulating unit 104 about the modulation scheme.

Note that the satellite station 1 may transmit information about data transmission which is instructed by the control unit 108, i.e., transmission control information indicating the encoding scheme of the encoding unit 103 and the modulation scheme of the modulating unit 104, such that the information together with data is included in a radio signal. By this, when the earth station 2 receives the radio signal from the satellite station 1, even when the encoding scheme and the modulation scheme change from moment to moment, the earth station 2 can correctly demodulate and decode the data by receiving the transmission control information prior to demodulation of the data.

The switching unit 105 performs frequency conversion for converting the frequency of the modulated data outputted from the modulating unit 104 to an intermediate frequency instructed by the control unit 108, and controls an output destination according to an instruction from the control unit 108 to output the data to any of the radio transmitting units 106 (step S5). Here, the switching unit 105 may have a signal reproduction function. In this case, the switching unit 105 may implement an equivalent function to that for when information on the amount of frequency conversion and the output destination is notified by the control unit 108, by obtaining the information by reproducing control information included in a part of data to be relayed. Furthermore, the switching unit 105 may be configured to include a built-in buffer. By using the built-in buffer, the switching unit 105 can smooth out a difference in transmission rate between satellite stations 1 upon relaying. Specifically, when the transmission rate of data inputted from a modulating unit 104 or a radio receiving unit 107 differs from the transmission rate of data outputted to a radio transmitting unit 106, the switching unit 105 adjusts, i.e., eliminates, the difference between the transmission rates, using the built-in buffer.

The radio transmitting unit 106 converts the frequency of the data outputted from the switching unit 105 to a carrier frequency instructed by the control unit 108, amplifies the frequency-converted data, and then transmits through the antenna the data as a radio signal in a polarization and an irradiation direction, i.e., a pointing direction (step S6), the polarization and the irradiation direction being instructed by the control unit 108. Here, the radio transmitting unit 106 may implement a change in irradiation direction, i.e., a beam center direction, by mechanically changing the orientation of the antenna. In addition, when the radio transmitting unit 106 is configured to form arbitrary beams by a plurality of radiating elements using a phased array antenna, the radio transmitting unit 106 may implement a change in beam center direction by changing the phase and amplitude of each element. Furthermore, when the radio transmitting unit 106 uses optical communication, the radio transmitting unit 106 may implement a change in beam center direction by changing the optical axis.

Figure 5:
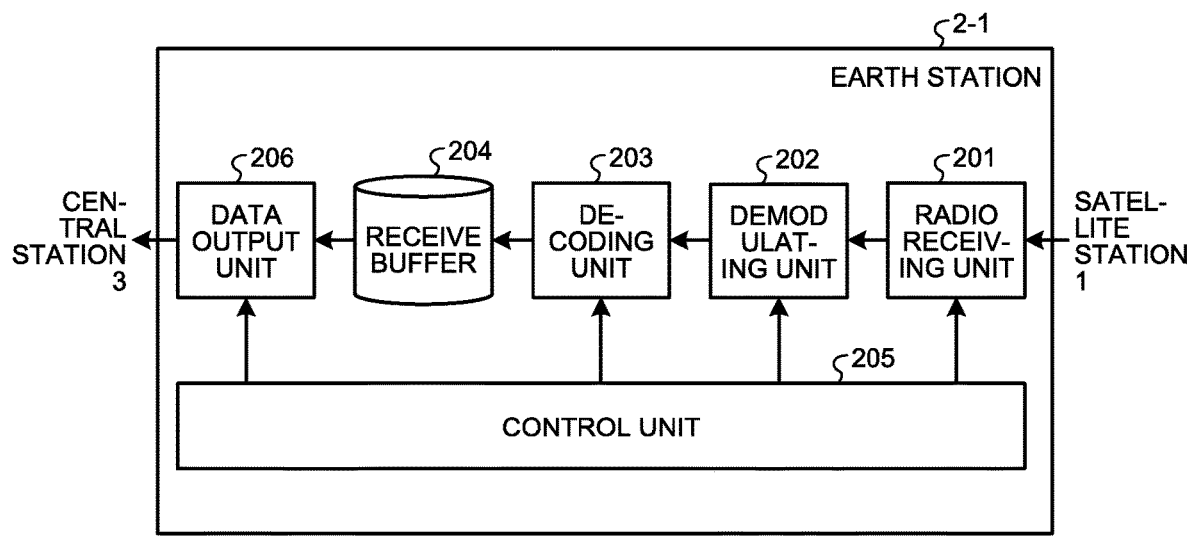
FIG. 5 is a block diagram illustrating an exemplary configuration of an earth station according to the first embodiment.

Next, the configuration and operation of the earth station 2 will be described. FIG. 5 is a block diagram illustrating an exemplary configuration of the earth station 2-1 according to the first embodiment. Since the earth stations 2-1 to 2-*n* have the same configuration, the earth station 2-1 is described as an example. The earth station 2-1 includes a radio receiving unit 201, a demodulating unit 202, a decoding unit 203, a receive buffer 204, a control unit 205, and a data output unit 206.

The radio receiving unit 201 includes an antenna whose pointing direction can be changed. The radio receiving unit 201 receives a radio signal from a satellite station 1 through the antenna, and converts the received radio signal into an electrical signal and outputs the electrical signal.

The demodulating unit 202 demodulates the electrical signal outputted from the radio receiving unit 201.

The decoding unit 203 decodes the electrical signal demodulated by the demodulating unit 202, and stores the decoded data in the receive buffer 204.

The receive buffer 204 accumulates the decoded data which is decoded data having been decoded by the decoding unit 203.

The control unit 205 receives control information from the control station 4, and controls the operation of each unit included in in the earth station 2, based on the received control information.

The data output unit 206 reads decoded data from the receive buffer 204, and outputs the decoded data to the central station 3.

The control information includes information instructing about the pointing direction of the antenna included in the radio receiving unit 201. In this case, the control unit 205 controls the pointing direction of the antenna included in the radio receiving unit 201, according to the information on the pointing direction included in the control information received from the control station 4. In addition, the control information includes information indicating a data demodulation scheme and a decoding scheme. In this case, the control unit 205 instructs the demodulating unit 202 about the data demodulation scheme and instructs the decoding unit 203 about the decoding scheme, according to the information indicating a data demodulation scheme and a decoding scheme which is included in the control information received from the control station 4. Note that instead of the control unit 205 controlling each unit based on all pieces of information included in the control information, the control unit 205 may perform control using at least one or more pieces of information.

Now, a hardware configuration of the earth station 2 will be described. In the earth station 2, each unit illustrated in FIG. 5 can be implemented as hardware such as a single apparatus or circuit. The radio receiving unit 201 is implemented by a receiver including a digital-analog converter circuit, an antenna whose directivity can be changed, etc. The demodulating unit 202 is a demodulator or a modem. The decoding unit 203 is a decoder. The receive buffer 204 is implemented by a memory. The control unit 205 is implemented by a processing circuit that controls each unit based on control information. The data output unit 206 is implemented by a transmitter. The above-described units each may be formed as a single circuit or apparatus, or a plurality of functional parts may be formed as a single circuit or apparatus.

The demodulating unit 202, the decoding unit 203, and the control unit 205 may be dedicated hardware, or may be a control circuit which is a processing circuit including a memory and a CPU that executes programs stored in the memory. When the demodulating unit 202, the decoding unit 203, and the control unit 205 are implemented by a control circuit including a CPU, the control circuit is, for example, the control circuit 10 having a configuration illustrated in FIG. 3. When the demodulating unit 202, the decoding unit 203, and the control unit 205 are implemented by the control circuit 10 illustrated in FIG. 3, those units are implemented by the processor 12 reading and executing programs corresponding to processes for the respective units and stored in the memory 13.

When the demodulating unit 202, the decoding unit 203, and the control unit 205 are implemented as dedicated hardware, those units are, for example, a single circuit, a combined circuit, a programmed processor, a parallel programmed processor, an ASIC, or an FPGA, or a combination thereof.

Figure 6:
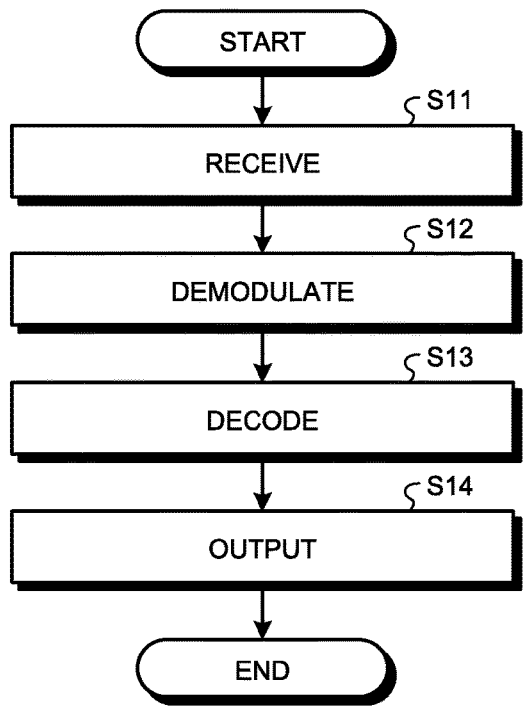
FIG. 6 is a flowchart illustrating the operation of the earth station according to the first embodiment.

Next, the operation of the earth station 2 will be described. FIG. 6 is a flowchart illustrating the operation of the earth station 2 according to the first embodiment. In the earth station 2, the radio receiving unit 201 receives a radio signal transmitted from a satellite station 1 (step S11). Here, the antenna included in the radio receiving unit 201 can change its pointing direction and polarization. The radio receiving unit 201 receives the radio signal, with the antenna pointed in a direction instructed by the control unit 205. The pointing direction of the antenna is notified by the control station 4 using control information. Note, however, that when the control unit 205 is instructed by the control station 4 that the earth station 2 is not a reception target, the control unit 205 may instruct the radio receiving unit 201 to stop reception of a radio signal from a satellite station 1. The radio receiving unit 201 converts the frequency of the receive signal to a frequency instructed by the control unit 205, and then converts the signal into an electrical signal and outputs the electrical signal.

The demodulating unit 202 demodulates the electrical signal outputted from the radio receiving unit 201 by a demodulation scheme instructed by the control unit 205 (step S12). For the demodulation scheme, in order to use a demodulation scheme appropriate to a modulation scheme used by the modulating unit 104 of the satellite station 1, a demodulation scheme notified to the earth station 2 from the control station 4 using control information is adopted, or the earth station 2 changes the demodulation scheme using a predetermined change pattern. When the demodulation scheme is changed using a predetermined change pattern, the change pattern is one associated with a change pattern for a modulation scheme which is determined in advance in the satellite station 1. Namely, in the data transmission system 5, the timing at which the satellite station 1 changes the modulation scheme and the timing at which the earth station 2 changes the demodulation scheme are set to coincide with each other.

Note that when the radio signal transmitted from the satellite station 1 includes transmission control information indicating a modulation scheme, an encoding scheme, and the like, in the earth station 2 the demodulating unit 202 may extract the transmission control information from the electrical signal and perform demodulation by a demodulation scheme appropriate to the modulation scheme included in the transmission control information. In addition, the demodulating unit 202 may perform demodulation and measure the reception quality of a receive signal which is the electrical signal. Specifically, the demodulating unit 202 measures a Signal to Interference plus Noise Ratio (SINR), using known data included in the receive signal, and notifies the control station 4 of the measured reception quality. In selection of a modulation scheme and an encoding scheme by the control station 4 which will be described later, the control station 4 can select a modulation scheme and an encoding scheme based on the latest reception quality.

The decoding unit 203 decodes the data demodulated by the demodulating unit 202, by a decoding scheme instructed by the control unit 205 (step S13). The decoding unit 203 stores the decoded data in the receive buffer 204. For the decoding scheme, as with the demodulation scheme of the demodulating unit 202, in order to use a decoding scheme appropriate to an encoding scheme used by the encoding unit 103 of the satellite station 1, the decoding scheme is notified to the earth station 2 from the control station 4 using control information. Alternatively, the decoding unit 203 may change the decoding scheme using a predetermined change pattern, or may perform decoding by a decoding scheme appropriate to an encoding scheme included in transmission control information. The decoded data outputted from the decoding unit 203 may be a hard decision value or may be a soft decision value.

In addition, the decoding unit 203 stores a reception result indicating whether the decoding has succeeded or failed, together with the decoded data in the receive buffer 204. For example, the encoding unit 103 of the satellite station 1 performs, as encoding, not only error correction coding such as LDPC codes or the like, but also error detection coding such as Cyclic Redundancy Check (CRC) codes or the like. By this, the decoding unit 203 can determine whether decoding has succeeded or failed, by decoding the CRC codes.

The receive buffer 204 holds the decoded data and reception result outputted from the decoding unit 203. The data output unit 206 reads the decoded data and the reception result from the receive buffer 204 at arbitrary timing, and outputs the decoded data and the reception result to the central station 3 (step S14). Note that the central station 3 and the earth station 2 are connected to each other by a dedicated line, etc., and the decoded data and the reception result can be outputted from the data output unit 206 to the central station 3.

Figure 7:
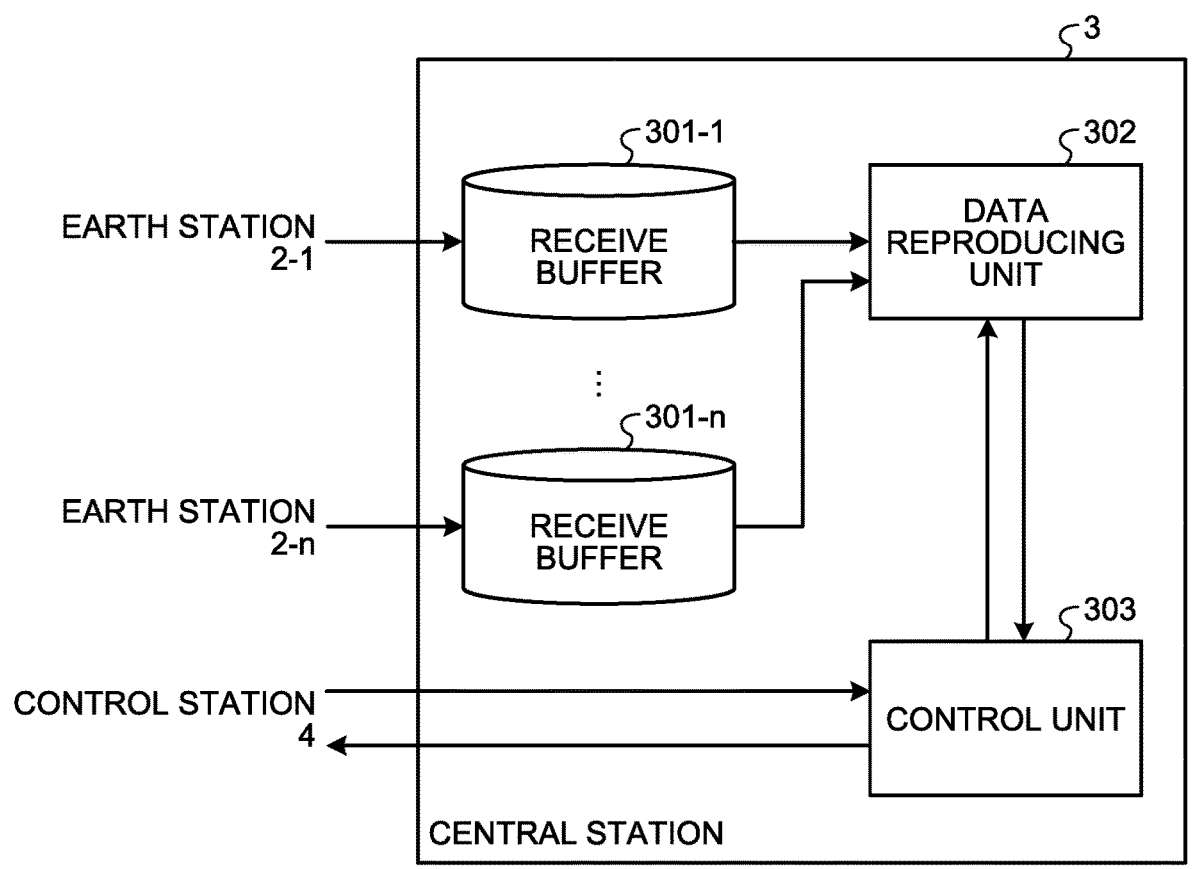
FIG. 7 is a block diagram illustrating an exemplary configuration of a central station according to the first embodiment.

Next, the configuration and operation of the central station 3 will be described. FIG. 7 is a block diagram illustrating an exemplary configuration of the central station 3 according to the first embodiment. The central station 3 includes receive buffers 301-1 to 301-$n$, a data reproducing unit 302, and a control unit 303. The "n" is an integer greater than or equal to one, and is the same number as the number of the earth stations 2. In the following description, the receive buffers 301-1 to 301-$n$ may be referred to as receive buffers 301 when not distinguished from each other.

The receive buffers 301-1 to 301-$n$ each store decoded data and a reception result which are outputted from one of the earth stations 2-1 to 2-$n$ connected to the receive buffers 301-1 to 301-$n$, respectively.

The data reproducing unit 302 manages the overlapping and missing of the decoded data received from the earth stations 2-1 to 2-$n$, and reproduces continuous decoded data as application data such as an image.

The control unit 303 transmits and receives control information to/from the control station 4, and controls the operation of the data reproducing unit 302 based on the received control information.

Now, a hardware configuration of the central station 3 will be described. Each unit illustrated in FIG. 7 can be implemented as hardware such as a single apparatus or circuit. The receive buffers 301-1 to 301-$n$ are implemented by a memory. The data reproducing unit 302 and the control unit 303 are implemented by a processing circuit. In addition, the control unit 303 includes a transmitter and a receiver. The above-described units each may be formed as a single circuit or apparatus, or a plurality of functional parts may be formed as a single circuit or apparatus.

The data reproducing unit 302 and the control unit 303 may be dedicated hardware, or may be a control circuit which is a processing circuit including a memory and a CPU that executes programs stored in the memory. When the data reproducing unit 302 and the control unit 303 are implemented by a control circuit including a CPU, the control circuit is, for example, the control circuit 10 having a configuration illustrated in FIG. 3. When the data reproducing unit 302 and the control unit 303 are implemented by the control circuit 10 illustrated in FIG. 3, those units are implemented by the processor 12 reading and executing programs corresponding to processes for the respective units and stored in the memory 13.

When the data reproducing unit 302 and the control unit 303 are implemented as dedicated hardware, those units are, for example, a single circuit, a combined circuit, a programmed processor, a parallel programmed processor, an ASIC, or an FPGA, or a combination thereof.

Figure 8:
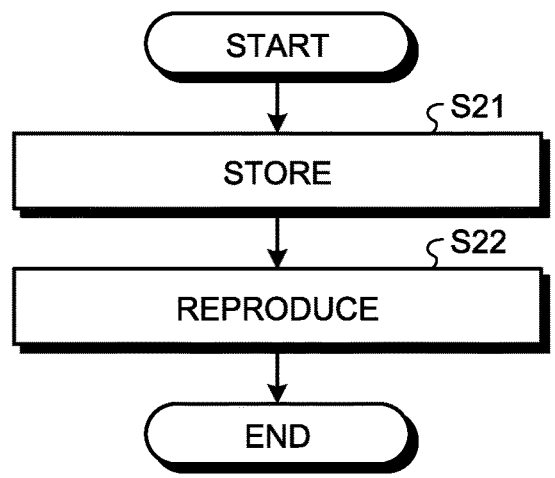
FIG. 8 is a flowchart illustrating the operation of the central station according to the first embodiment.

Next, the operation of the central station 3 will be described. FIG. 8 is a flowchart illustrating the operation of the central station 3 according to the first embodiment. In the central station 3, the receive buffers 301-1 to 301-$n$ store and hold decoded data and reception results outputted from the earth stations 2-1 to 2-$n$ (step S21).

The data reproducing unit 302 reads decoded data from the receive buffers 301-1 to 301-$n$ and manages the overlapping and missing of the decoded data, and selectively reads decoded data stored in each of the receive buffers 301-1 to 301-*n* such that the read data is a continuous data string, and reproduces the data as application data such as an image (step S22).

Here, it is assumed that data generated by the data generating unit 101 of the satellite station 1 is formed into frames, and the data generating unit 101 adds a sequence number to each frame. In addition, it is assumed that the encoding unit 103 of the satellite station 1 encodes the data including the sequence numbers, frame by frame. In this case, decoded data is generated frame by frame, and each decoded data includes a sequence number. By this, the data reproducing unit 302 can arrange the decoded data stored in the receive buffers 301-1 to 301-*n* in the correct order, based on the sequence numbers. When pieces of decoded data overlap each other, i.e., when there are a plurality of pieces of decoded data with the same sequence number, if it can be confirmed by reception results that all of the pieces of decoded data have been decoded correctly, then the pieces of decoded data can be considered to be all identical. The data reproducing unit 302 selects any one of the pieces of decoded data by an arbitrary method. At this time, the data reproducing unit 302 may select, based on an earth station 2 serving as a reception target and notified by the control unit 303, decoded data stored in any of the receive buffers 301-1 to 301-*n* associated with the earth station 2 serving as a reception target.

In addition, the data reproducing unit 302 may discard decoded data that has not been able to be received properly, using the reception results stored in the receive buffers 301-1 to 301-*n*. By this, there is no possibility that the data reproducing unit 302 uses decoded data with the wrong sequence numbers, enabling to prevent erroneous operation. Furthermore, the data reproducing unit 302 may rearrange decoded data, in addition to the selection of decoded data. For example, a router is connected between each earth station 2 and the central station 3, and even when the order of decoded data is reversed in the routers, the data reproducing unit 302 can generate a continuous data string by rearranging the decoded data using the sequence numbers.

In addition, when the data reproducing unit 302 has detected missing of decoded data, the data reproducing unit 302 may notify the control unit 303 of a missing sequence number. In this case, the control unit 303 generates control information that stores information indicating the missing sequence number, and notifies the control station 4 of the control information. By this, the control station 4 can instruct a satellite station 1 to retransmit data corresponding to the missing decoded data, enabling to achieve highly reliable transmission. Furthermore, the control unit 303 may store, in control information, the missing sequence number and identification information of an earth station 2 which is the source of corresponding decoded data, and notify the control station 4 of the control information. The control station 4 can detect a reception failure on a per earth station 2 basis. By this, when the control station 4 is notified of reception failures in a given earth station 2 whose number is greater than or equal to a predetermined threshold value, the control station 4 determines that any of satellite stations 1 present in a transmission path used when a satellite station 1 transmits data to the earth station 2 through a plurality of satellite stations 1 is in an abnormal state, and thus can change the transmission path.

Figure 9:
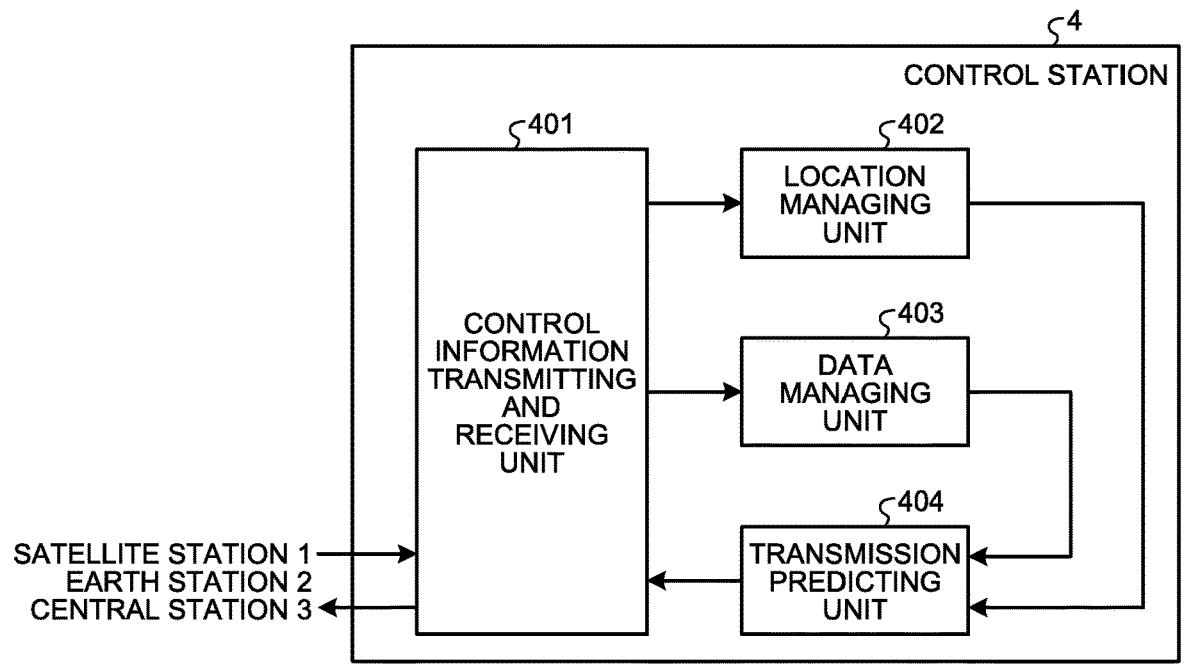
FIG. 9 is a block diagram illustrating an exemplary configuration of a control station according to the first embodiment.

Next, the configuration and operation of the control station 4 will be described. FIG. 9 is a block diagram illustrating an exemplary configuration of the control station 4 according to the first embodiment. The control station 4 includes a control information transmitting and receiving unit 401, a location managing unit 402, a data managing unit 403, and a transmission predicting unit 404.

The control information transmitting and receiving unit 401 transmits and receives control information to/from the satellite stations 1, the earth stations 2, and the central station 3. The control station 4 performs transmission and reception of control information with the earth stations 2 directly and with the central station 3 through the earth stations 2, by wired communication. Methods for transmitting and receiving control information between a satellite station 1 and the control station 4 include, for example, a method through a data relay satellite, a communications satellite disposed in geostationary orbit, or the like, in addition to a method via an earth station 2 and the central station 3. In this case, a satellite station 1 orbiting the Earth can transmit and receive control information at any time wherever the location of the satellite station 1. In addition, as another method, control information may be relayed between satellite stations 1, using a predetermined time and frequency. For example, since many orbits of orbiting satellites pass through an area around the North Pole or the South Pole, an apparatus for transmitting and receiving control information is installed near the North Pole or the South Pole. The control station 4 is connected to the apparatus to perform transmission and reception of control information. A satellite station 1 transmits and receives control information when passing through over the apparatus, and may relay the control information to another satellite station 1 orbiting the same orbital plane, e.g., in an orbit with equal Local Sun Time (LST).

The location managing unit 402 stores the locations of the satellite stations 1 and the earth stations 2. Here, when a satellite station 1 is an orbiting satellite which orbits the Earth, the location relationship between the Earth and the satellite station 1 changes from moment to moment. Hence, the location managing unit 402 stores the latest location of the satellite station 1. In addition, when a satellite station 1 moves along a predetermined orbit, the location managing unit 402 stores the location of the satellite station 1 for a future time, in addition to the latest location of the satellite station 1. In addition, the location managing unit 402 calculates, based on the locations of the satellite stations 1 and the locations of the earth stations 2, communicable times for combinations of a satellite station 1 and an earth station 2 that can communicate with each other. The combination of a satellite station 1 and an earth station 2 that can communicate with each other refers to a combination of an earth station 2 and a satellite station 1 present in a visible range of the earth station 2. The visible range refers to a range in which the earth station 2 and the satellite station 1 can get a clear view of each other without any shielding object between the earth station 2 and the satellite station 1, and can communicate each other.

The data managing unit 403 holds the retention time of data retained in the transmit buffer 102 of a satellite station 1 and the amount of the data retained. The data retention time and the amount of data retained are collectively referred to as information on a retention state of data.

The transmission predicting unit 404 calculates a data transmission completion time which is the time required to transmit data of a satellite station 1 in which the data is generated and retained to an earth station 2, based on the information stored in the location managing unit 402 and the data managing unit 403, specifically, the communicable times and the information on a retention state of data. In addition, the transmission predicting unit 404 determines a transmission path from the satellite station 1 having generated the data to the earth station 2 which is the destination of the data, so as to obtain the shortest data transmission completion time, and generates control information for satellite stations 1 and the earth station 2 in the determined transmission path, to transmit the data in the determined transmission path. Namely, when the transmission predicting unit 404 has calculated data transmission completion times for a plurality of transmission paths, the transmission predicting unit 404 determines to transmit data in a transmission path with the smallest retention delay of data in the satellite station 1 having generated the data.

Control information generated by the transmission predicting unit 404 includes information on a start time at which reading of data from the transmit buffer 102 starts, a data read speed, an encoding scheme, and a stop time at which the reading of the data stops, for an encoding unit 103 of a satellite station 1. In addition, the control information generated by the transmission predicting unit 404 includes information on a modulation scheme for a modulating unit 104, a routing table for changing input and output ports and frequency for the switching unit 105, a pointing direction of the antenna for a radio transmitting unit 106, and a pointing direction of the antenna for a radio receiving unit 107. In addition, the control information generated by the transmission predicting unit 404 includes information on a pointing direction of the antenna for the radio receiving unit 201 of an earth station 2, a demodulation scheme for the demodulating unit 202, and a decoding scheme for the decoding unit 203.

The transmission predicting unit 404 determines an encoding scheme and a modulation scheme for a satellite station 1 having generated data, by a location relationship between a satellite station 1 that is the last one to transmit the data to an earth station 2 and the earth station 2. For example, when a first satellite station which is a satellite station 1 having generated data can directly transmit the data to an earth station 2, the transmission predicting unit 404 determines an encoding scheme and a modulation scheme, based on the angle of elevation of the earth station 2 pointed to the first satellite station. In addition, when a first satellite station which is a satellite station 1 having generated data transmits the data to an earth station 2 through a second satellite station which is another satellite station 1, the transmission predicting unit 404 determines an encoding scheme and a modulation scheme, based on the angle of elevation of the earth station 2 pointed to the second satellite station. By this, the transmission predicting unit 404 can perform control to change the encoding scheme and the modulation scheme in accordance with the actual data reception state of the earth station 2.

In addition, a data transmission period for a satellite station 1 having generated data is determined by a location relationship between a satellite station 1 that is the last one to transmit the data to an earth station 2 and the earth station 2. For example, when a first satellite station having generated data can directly transmit the data to an earth station 2, the transmission predicting unit 404 determines a data transmission period, based on the angle of elevation of the earth station 2 pointed to the first satellite station. In addition, when a first satellite station having generated data transmits the data to an earth station 2 through a second satellite station, the transmission predicting unit 404 determines a data transmission period, based on the angle of elevation of the earth station 2 pointed to the second satellite station. By this, the transmission predicting unit 404 can perform control to change the data transmission period in accordance with the time during which the second satellite station can communicate with the earth station 2.

Note that the control information may be obtained by combining together pieces of information per unit time which are obtained at each time of a period from the start of data transmission until the data transmission stops. For example, when each unit time is 10 seconds and the period from the start of data transmission until the data transmission stops is 100 seconds, the transmission predicting unit 404 generates a single piece of control information by combining together 10 pieces of control information, each obtained every 10 seconds. The unit times can be freely set.

Now, a hardware configuration of the control station 4 will be described. In the control station 4, each unit illustrated in FIG. 9 can be implemented as hardware such as a single apparatus or circuit. The control information transmitting and receiving unit 401 is implemented by a transmitter and a receiver. The location managing unit 402, the data managing unit 403, and the transmission predicting unit 404 are implemented by a processing circuit. The above-described units each may be formed as a single circuit or apparatus, or a plurality of functional parts may be formed as a single circuit or apparatus.

The location managing unit 402, the data managing unit 403, and the transmission predicting unit 404 may be dedicated hardware, or may be a control circuit including a memory and a CPU that executes programs stored in the memory. When the location managing unit 402, the data managing unit 403, and the transmission predicting unit 404 are implemented by a control circuit which is a processing circuit including a CPU, the control circuit is, for example, the control circuit 10 having a configuration illustrated in FIG. 3. When the location managing unit 402, the data managing unit 403, and the transmission predicting unit 404 are implemented by the control circuit 10 illustrated in FIG. 3, those units are implemented by the processor 12 reading and executing programs corresponding to processes for the respective units and stored in the memory 13.

When the location managing unit 402, the data managing unit 403, and the transmission predicting unit 404 are implemented as dedicated hardware, those units are, for example, a single circuit, a combined circuit, a programmed processor, a parallel programmed processor, an ASIC, or an FPGA, or a combination thereof.

Figure 10:
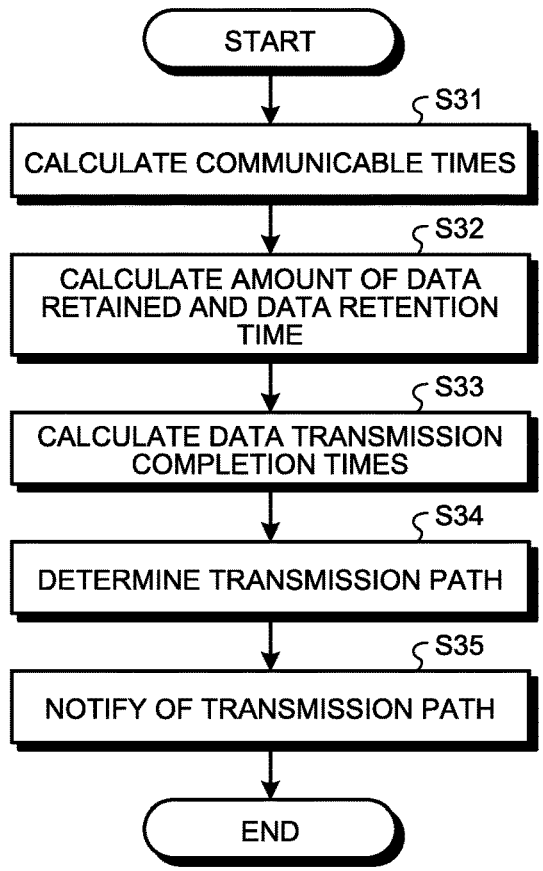
FIG. 10 is a flowchart illustrating the operation of the control station according to the first embodiment.

Next, the operation of the control station 4 will be described. FIG. 10 is a flowchart illustrating the operation of the control station 4 according to the first embodiment. Here, an example will be described in which the control station 4 determines a transmission path for a satellite station 1 to generate and transmit data to an earth station 2, etc. Specifically, the control station 4 determines an encoding scheme and a modulation scheme which are used for transmitting data by a satellite station 1, a pointing direction for the transmission, a pointing direction for receiving the data by an earth station 2, and the like.

In the control station 4, the location managing unit 402 calculates communicable times between satellite stations 1 and earth stations 2 (step S31). Upon calculating communicable times, the location managing unit 402 calculates, from the locations of each satellite station 1 and each earth station 2 stored therein, the angle of elevation of each earth station 2 pointed to each satellite station 1. The location managing unit 402 determines that communication can be performed in a combination of a satellite station 1 and an earth station 2 whose angle of elevation is greater than or equal to a specified value. Likewise, the location managing unit 402 determines, from the location relationship between satellite stations 1, that communication can be performed when satellite stations 1 are present in a clear view range, i.e., the satellite stations 1 are not shielded by any obstacle such as the Earth. Note that in the determination as to whether communication can be performed, the location managing unit 402 may add a criterion for determining that communication can be performed when communication quality is determined to be greater than or equal to a specified value, based on the distance between a satellite station 1 which is a transmission target and a satellite station 1 or an earth station 2 which is a reception target, the transmission power of the satellite station 1 which is the transmission target, etc.

The data managing unit 403 calculates the amount of data retained in the transmit buffer 102 of a satellite station 1 and the retention time of the data (step S32). Here, the amount of data retained may be notified to the control station 4 every time the satellite station 1 generates data, or when the amount of data generated at a time is determined in advance, only an event that data is generated may be notified to the control station 4 from the satellite station 1. In addition, a data retention time may be periodically notified to the control station 4 from the satellite station 1, or when a plurality of pieces of data with different data generation times are retained in the transmit buffer 102, the satellite station 1 may notify the control station 4 of different data retention times. In addition, when the satellite station 1 notifies of an event of generation of data, the control station 4 may use a time at which the notification is received from the satellite station 1, as a starting point for calculating the amount of data retained. Furthermore, when a data generation time is determined in advance, a data retention time does not necessarily need to be notified to the control station 4 from the satellite station 1. This corresponds to, for example, a case in which an observation satellite which is a satellite station 1 systematically observes the Earth.

The transmission predicting unit 404 calculates, using the communicable times, the amount of data retained, and the data retention time, the time required to transmit all data represented by the amount of data retained from the satellite station 1 to an earth station 2, i.e., a data transmission completion time (step S33). The transmission predicting unit 404 calculates data transmission completion times for all transmission paths used for transmission from the satellite station 1 having data retained therein and serving as a starting point to an earth station 2 directly or through another satellite station 1. The transmission predicting unit 404 calculates a data transmission completion time for each transmission path, from the time required before communication is ready, the expected amount of transmission per unit time during a communicable time, the data retention time, and the amount of data retained.

For example, it is assumed that at a time at which the present process is performed, the data retention time is 10 seconds, the amount of data retained is one megabit, the time required before communication is ready is three seconds, and the expected amount of transmission per second during a communicable time is 200 kilobits. In this case, the transmission predicting unit 404 adds five seconds which is required when one megabit is transmitted at an expected amount of transmission per second of 200 kilobits, to 10 seconds which is the data retention time and three seconds which is the time required before communication is ready, and thereby calculates 18 seconds=10+3+5 as a data transmission completion time. The expected amount of transmission can be calculated by integrating frequency use efficiency per unit time (bit/sec/Hz) over a communicable time, the frequency use efficiency being obtained when an encoding scheme and a modulation scheme that satisfy a specified error rate are selected in communication quality determined from the distance of a radio section in a transmission path and the amount of attenuation caused by rainfall, etc. Note that when a transmission path passes through a plurality of satellite stations 1, the smallest value of the expected amounts of transmission per unit time of respective radio sections in the transmission path is determined to be the expected amount of transmission per unit time of the transmission path. This can prevent data from being discarded on the way due to the difference in transmission rate between the radio sections.

When the transmission predicting unit 404 has calculated data transmission completion times for all candidates for the transmission path, the transmission predicting unit 404 determines a transmission path with the shortest data transmission completion time, as the transmission path (step S34). The transmission predicting unit 404 notifies satellite stations 1 and the earth station 2 included in the determined transmission path, of the transmission path through the control information transmitting and receiving unit 401 (step S35). Notifying of the transmission path by the transmission predicting unit 404 is the same as generating and transmitting the above-described control information by the transmission predicting unit 404.

By this, in the data transmission system 5, by control performed by the control station 4, a satellite station 1 having generated data can transmit the data to an earth station 2 in a transmission path with the shortest data transmission completion time, i.e., the smallest retention delay.

Figure 11:
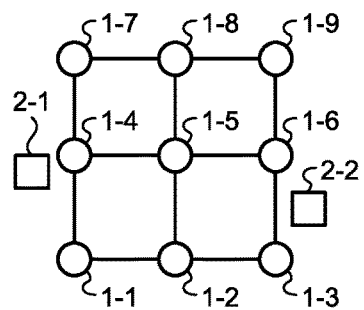
FIG. 11 is a diagram illustrating an example of a location relationship between satellite stations and earth stations for each time, according to the first embodiment.
Figure 11:
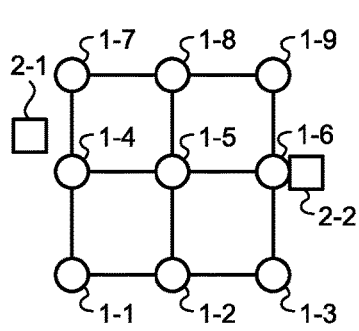
Figure 11:
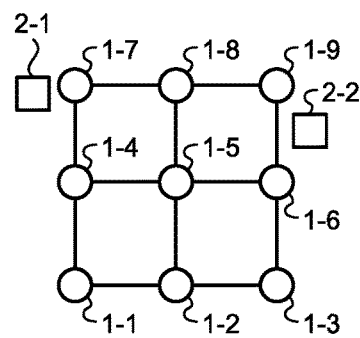

Now, an advantageous effect obtained when the above-described process by the control station 4 is performed will be described using FIGS. 11 to 13. FIG. 11 is a diagram illustrating an example of a location relationship between satellite stations 1 and earth stations 2 for each time, according to the first embodiment. FIG. 11 illustrates an example in which the location relationship between satellite stations 1 and earth stations 2 differs from that of the data transmission system 5 illustrated in FIG. 1. Here, it is assumed that satellite stations 1-1 to 1-9 move in a direction illustrated in FIG. 11 in the order of time t1→t2→t3. Note that in FIG. 11 depiction of the central station 3 and the control station 4 is omitted.

Figure 12:
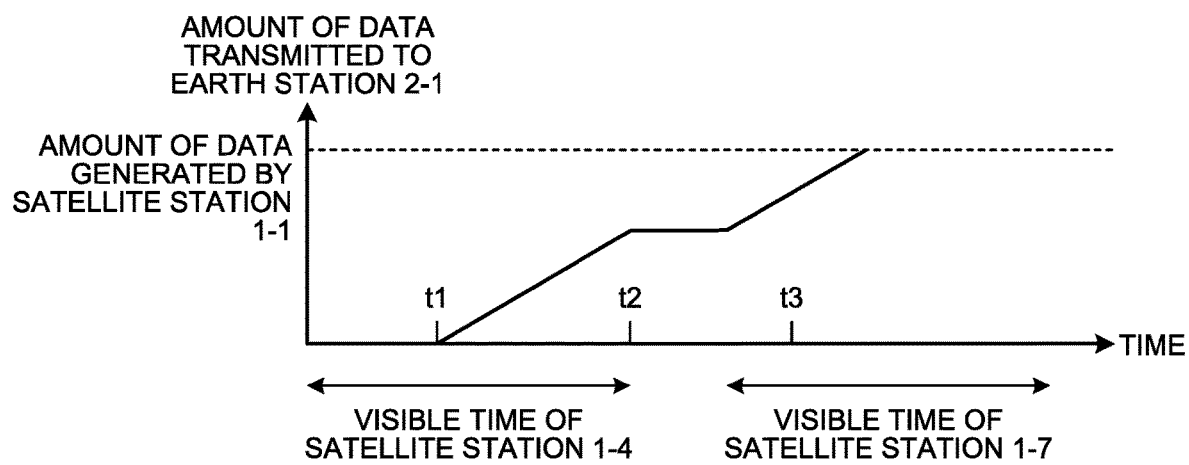
FIG. 12 is a diagram illustrating an example of changes over time in the amount of data transmitted for when a satellite station transmits data to an earth station through two satellite stations, according to the first embodiment.

FIG. 12 is a diagram illustrating an example of changes over time in the amount of data transmitted for when the satellite station 1-1 transmits data to an earth station 2-1 through two satellite stations 1-4 and 1-7, according to the first embodiment. FIG. 12 illustrates a relationship between the time and the amount of data transmitted for a case in which the satellite station 1-1 generates data and transmits the data to the earth station 2-1. At time t1, an earth station 2 closest to the satellite station 1-1 is the earth station 2-1. The satellite station 1-1 can transmit the data to the earth station 2-1 by relaying the data through the satellite station 1-4 which is within visible time, i.e., a communicable time, at time t1.

However, at time t1, the satellite station 1-4 has already passed about half of the visible time of the earth station 2-1. Due to this, at time t2 which is outside the visible time of the earth station 2-1, the satellite station 1-4 cannot yet transmit all data generated by the satellite station 1-1. The satellite station 1-1 can transmit all data to the earth station 2-1 by relaying the data through the satellite station 1-7 that moves to the visible range of the earth station 2-1 next, but the satellite station 1-1 needs to wait until the satellite station 1-7 moves to the visible range of the earth station 2-1. When the satellite station 1-1 transmits the data to the earth station 2-1, delay increases due to the waiting time for the satellite station 1-7 to move to the visible range of the earth station 2-1. In addition, the satellite station 1-1 needs to perform a transmission path switching process.

Figure 13:
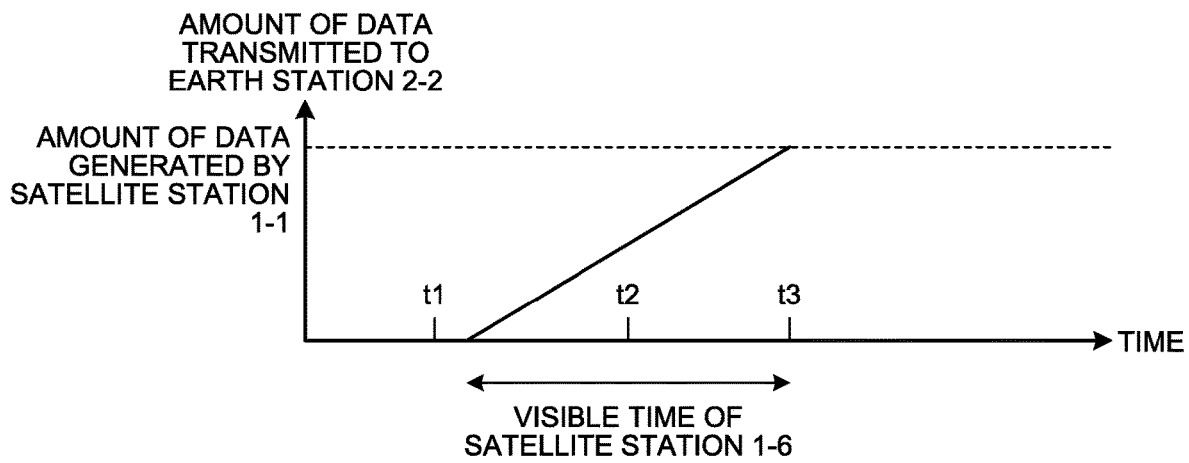
FIG. 13 is a diagram illustrating an example of changes over time in the amount of data transmitted for when a satellite station transmits data to an earth station through one satellite station, according to the first embodiment.

FIG. 13 is a diagram illustrating an example of changes over time in the amount of data transmitted for when the satellite station 1-1 transmits data to an earth station 2-2 through one satellite station 1-6, according to the first embodiment. FIG. 13 illustrates a relationship between the time and the amount of data transmitted for a case in which the satellite station 1-1 generates data and transmits the data to the earth station 2-2. At time t1, the satellite station 1-6 is outside the visible range of the earth station 2-2. However, when the satellite station 1-6 has moved into the visible range of the earth station 2-2, by the satellite station 1-1 relaying the data through the satellite station 1-6, the satellite station 1-1 can transmit all data before t3 which is within the visible time of the earth station 2-2 with respect to the satellite station 1-6.

Note that although the above-described process shows an example case in which only one satellite station 1 has generated data, a plurality of satellite stations 1 may retain data at identical times and transmit the data to an earth station 2. When the control station 4 calculates a transmission path for newly starting data transmission, the control station 4 excludes, from a candidate, a transmission path which is already secured for data transmission by another satellite station 1 and in which a satellite station 1 cannot be oriented in a new pointing direction or a frequency for relay cannot be additionally secured. For example, a case is assumed in which in FIGS. 11 and 12 the satellite station 1-1 newly transmits data to the earth station 2-2. When the satellite station 1-5 is already used for data transmission by another satellite station 1 or is planned to be used in the future, the control station 4 extracts the transmission path "satellite station 1-1→satellite station 1-2→satellite station 1-3→satellite station 1-6" as a candidate.

Figure 14:
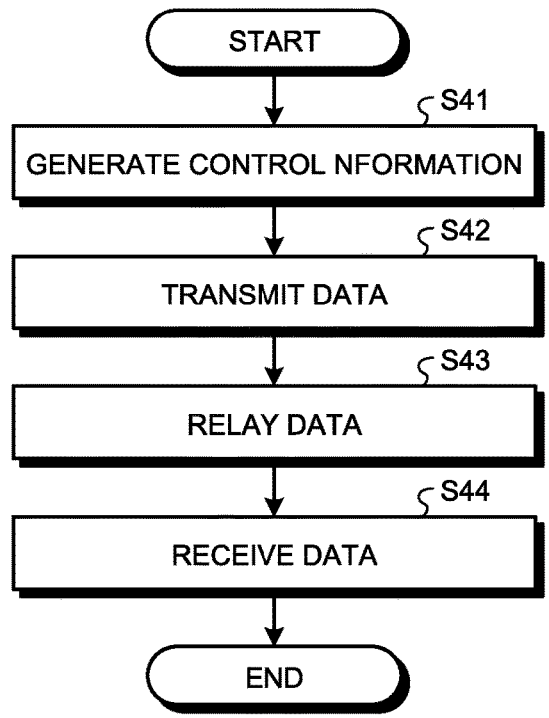
FIG. 14 is a flowchart illustrating operation performed by a satellite station having generated data to transmit the data to an earth station in the data transmission system according to the first embodiment.

The flow of operation of each station as the data transmission system 5 will be described. FIG. 14 is a flowchart illustrating operation performed by a satellite station 1 having generated data to transmit the data to an earth station 2 in the data transmission system 5 according to the first embodiment.

The control station 4 calculates data transmission completion times for one or more transmission paths from a satellite station 1 having generated data to an earth station 2, based on communicable times for combinations of a satellite station 1 and an earth station 2 that can communicate with each other and information on a retention state of the data in the satellite station 1 having generated the data. The control station 4 generates and transmits control information for satellite stations 1 and the earth station 2 in a determined transmission path which is determined based on the data transmission completion times, to transmit the data in the determined transmission path (step S41).

The satellite station 1 having generated the data encodes and modulates the generated data based on the control information, and controls its pointing direction to transmit the data (step S42).

A satellite station 1 that relays the data controls its pointing direction for receiving data, based on the control information, to receive the data from the satellite station 1 having generated the data or from its preceding satellite station 1 in the transmission path. The satellite station 1 that relays the data controls its pointing direction for transmitting data, to transmit the received data to the earth station 2 or its following satellite station 1 in the transmission path (step S43). Note that when the satellite station 1 having generated the data can directly transmit the data to the earth station 2, the operation at step S43 can be omitted.

The earth station 2 controls its pointing direction for receiving data, based on the control information, to receive the data (step S44).

As described above, according to the present embodiment, in the data transmission system 5 in which a satellite station 1 transmits data to the central station 3 through an earth station 2, the control station 4 calculates a data transmission completion time which is an expected value of the amount of data transmitted at a future time of each satellite station 1, determines a transmission path so as to obtain the shortest retention time of data retained in the satellite station 1, and notifies satellite stations 1 and the earth station 2 of control information so as to perform data transmission in the determined transmission path. By this, the data transmission system 5 can reduce the time from when a satellite station 1 generates data until the data is transmitted to an earth station 2.

Second Embodiment

In the first embodiment, when a satellite station 1 transmits data to an earth station 2 through a plurality of satellite stations 1, the control station 4 determines a transmission path with the shortest data transmission completion time. However, since there is ultimately a single transmission path in which the data is transmitted from the satellite station 1 to the earth station 2, even if a plurality of earth stations 2 are disposed, an earth station 2 which is the destination of data is only one earth station at identical times. In a second embodiment, a method will be described in which the use efficiency of earth stations 2 is improved to achieve lower-delay transmission.

The data transmission system 5 of the second embodiment is the same as that of the first embodiment illustrated in FIG. 1. In the second embodiment, the process of determining a transmission path by the control station 4 differs from that of the first embodiment. Description of the same portions as those of the first embodiment is omitted, and in the following description different portions from those of the first embodiment will be described.

Figure 15:
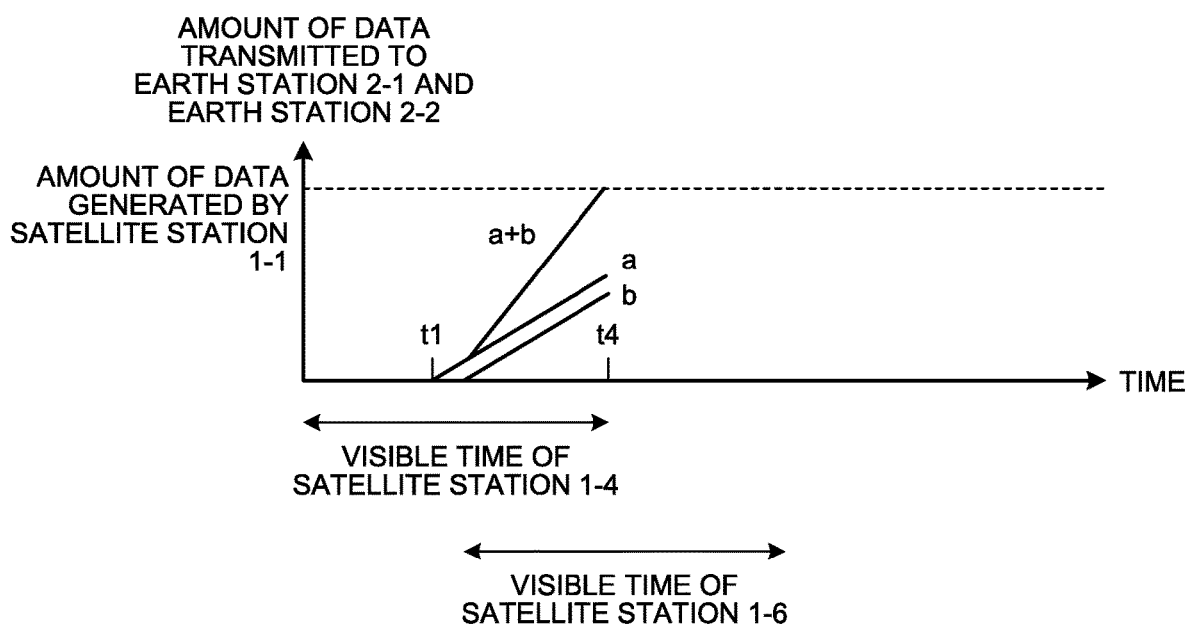
FIG. 15 is a diagram illustrating an example of changes in data transmission completion time for when a satellite station transmits data to two earth stations, according to a second embodiment.

FIG. 15 is a diagram illustrating an example of changes in data transmission completion time for when the satellite station 1-1 transmits data to two earth stations 2-1 and 2-2, according to the second embodiment. FIG. 15 illustrates a relationship between the time and the amount of data transmitted for a case in which the satellite station 1-1 generates data and transmits the data to the earth stations 2-1 and 2-2. In the first embodiment, when the control station 4 calculates a data transmission completion time for each transmission path, a data transmission target is one earth station 2 per transmission path. In the second embodiment, the control station 4 uses all earth stations 2 communicable in transmission paths as data transmission targets. The control station 4 determines a plurality of transmission paths as transmission paths with the shortest data transmission completion time, and notifies satellite stations 1 and earth stations 2 included in the transmission paths of control information.

As such, when a satellite station 1 includes resources required to construct a plurality of transmission paths and the resources are not yet used for data transmission by another satellite station 1, the number of transmission paths determined is not limited to one, and the control station 4 may determine a plurality of transmission paths with available resources being an upper limit. In this case, the control station 4 calculates a data transmission completion time using the sum of the expected amounts of transmission for the plurality of transmission paths. The term "resources required to construct a plurality of transmission paths" refers to a case in which the radio transmitting units 106 include antennas that can perform irradiation in two or more different pointing directions and the satellite station 1-1 include two or more encoding units 103 and modulating units 104, i.e., a case in which i and j are two or more.

For example, when the satellite station 1-1 transmits data to the earth stations 2-1 and 2-2 at time t1 of FIG. 11, the satellite station 1-1 transmits the data to the earth station 2-1 through the satellite station 1-4 and transmits the data to the earth station 2-2 through the satellite station 1-4→the satellite station 1-5→the satellite station 1-6. In this case, since the visible time of the earth station 2-1 with respect to the satellite station 1-4 differs from the visible time of the earth station 2-2 with respect to the satellite station 1-6, the angles of elevation of the respective earth stations 2 at identical times also differ from each other. Therefore, in order to transmit the data to the two earth stations 2, the control station 4 instructs the satellite station 1-1 to generate signals having two different patterns for an encoding scheme and a modulation scheme. The two different patterns for an encoding scheme and a modulation scheme are a pattern for a data encoding scheme and a data modulation scheme for transmission to the earth station 2-1 and a pattern for a data encoding scheme and a data modulation scheme for transmission to the earth station 2-2. In addition, by an instruction from the control station 4, the switching unit 105 of the satellite station 1-4 changes frequency and the radio transmitting units 106 which are output destinations, so as to transmit the two signals transmitted from the satellite station 1-1, to the earth station 2-1 and the satellite station 1-5, respectively.

As illustrated in FIG. 15, in the second embodiment, the amount of data transmitted (a+b) which is obtained by adding up the amount of data transmitted (a) for when the satellite station 1-1 transmits the data to the earth station 2-1 through the satellite station 1-4 and the amount of data transmitted (b) for when the satellite station 1-1 transmits the data to the earth station 2-2 through the satellite stations 1-4, 1-5, and 1-6 is the amount of data transmitted from the satellite station 1-1 to the earth stations 2.

As described above, according to the present embodiment, in the data transmission system 5, the control station 4 determines transmission paths so as to transmit data using a plurality of earth stations 2, and notifies satellite stations 1 and the earth stations 2 of control information so as to perform data transmission in the determined transmission paths. By this, the data transmission system 5 can reduce the time from when a satellite station 1 generates data until the data is transmitted to earth stations 2, compared to a case of using only one earth station 2, i.e., the first embodiment.

The configurations shown in the above-described embodiments show an example of the content of the present invention and can also be combined with other publicly known techniques, or some of the configurations can also be omitted or changed without departing from the spirit and scope of the present invention.

REFERENCE SIGNS LIST

1-1 to 1-m satellite station; 2-1 to 2-n earth station; 3 central station; 4 control station; 5 data transmission system; 101 data generating unit; 102 transmit buffer; 103-1 to 103-i encoding unit; 104-1 to 104-i modulating unit; 105 switching unit; 106-1 to 106-j radio transmitting unit; 107-1 to 107-k, 201 radio receiving unit; 108, 205, 303 control unit; 202 demodulating unit; 203 decoding unit; 204, 301-1 to 301-n receive buffer; 206 data output unit; 302 data reproducing unit; 401 control information transmitting and receiving unit; 402 location managing unit; 403 data managing unit; 404 transmission predicting unit.

The invention claimed is:

1. A control station comprising:
a location managing circuitry to calculate communicable times for combinations of a satellite transceiver and an earth station that are capable of communicating with each other, based on a location of a satellite transceiver that transmits data to an earth station and locations of earth stations serving as candidates to which the satellite transceiver transmits the data;
a data managing circuitry to hold information on a retention state of the data in the satellite transceiver having generated the data; and
a transmission predicting circuitry to calculate data transmission completion times for one or more transmission paths from the satellite transceiver having generated the data to the earth station, based on the communicable times and the information on a retention state of the data, and generate control information for satellite transceivers and the earth station in a transmission path determined based on the data transmission completion times, to transmit the data in the determined transmission path.

2. The control station according to claim 1, wherein the control information includes:
information instructing a first satellite transceiver about at least one or more of a transmission period of the data, a read speed of the data, an encoding scheme for the data, a modulation scheme for the data, an output destination of the data in a switching circuitry, and a pointing direction for transmitting the data, the first satellite transceiver being the satellite transceiver having generated the data;
information instructing a second satellite transceiver about at least one or more of a pointing direction for receiving data, an output destination of the data in a switching circuitry, and a pointing direction for transmitting the data, the second satellite transceiver being a satellite transceiver that transmits the data received from another satellite transceiver; and
information instructing the earth station about at least one or more of a pointing direction for receiving the data, a demodulation scheme for the received data, and a decoding scheme for the demodulated data.

3. The control station according to claim 2, wherein
when the transmission predicting circuitry has calculated data transmission completion times for a plurality of transmission paths, the transmission predicting circuitry determines the encoding scheme and the modulation scheme, based on an angle of elevation of the earth station pointed to the second satellite transceiver that transmits the data to the earth station.

4. The control station according to claim 2, wherein
the transmission predicting circuitry determines the transmission period of the data, based on an angle of elevation of the earth station pointed to the second satellite transceiver that transmits the data to the earth station.

5. The control station according to claim 1, wherein
when the transmission predicting circuitry has calculated data transmission completion times for a plurality of transmission paths, the transmission predicting circuitry determines to transmit the data in a transmission path with smallest retention delay of the data in the satellite transceiver having generated the data.

6. A satellite transceiver comprising:
an encoding circuitry to read generated data from a buffer and encode the data;
a modulating circuitry to modulate the encoded data;
a radio receiving circuitry capable of changing a pointing direction when receiving data from another satellite transceiver;
a switching circuitry to accept, as input, the data modulated by the modulating circuitry or data received by the radio receiving circuitry, and control a data output destination;
a plurality of radio transmitting circuitries each capable of changing a pointing direction when transmitting data outputted from the switching circuitries; and
a controller to control operation of each circuitry, based on control information generated by a control station according to claim 1.

7. The satellite transceiver according to claim 6, wherein the controller controls, based on the control information, at least one or more of a transmission period of the data, a read speed of the data, an encoding scheme of the encoding circuitry, a modulation scheme of the modulating circuitry, the pointing direction of the radio receiving circuitry, the output destination of the data in the switching circuitry, and the pointing directions of the radio transmitting circuitries.

8. The satellite transceiver according to claim 7, comprising a plurality of the encoding circuitries and a plurality of the modulating circuitries, each of which is connected to one of the encoding circuitries, wherein
pieces of modulated data outputted from the plurality of modulating circuitries are generated such that at least one or more of a data read period from the buffer by the encoding circuitries, a read speed of the data from the buffer by the encoding circuitries, the encoding scheme, and the modulation scheme is different between the pieces of modulated data, the data read period being based on the transmission period.

9. The satellite transceiver according to claim 6, wherein the radio receiving circuitry and the radio transmitting circuitries are pointed to any of a satellite in geostationary orbit, an earth station, or the another satellite transceiver.

10. The satellite transceiver according to claim 6, wherein the switching circuitry divides the data modulated by the modulating circuitry or the data received by the radio receiving circuitry into a plurality of frequency bands, rearranges the divided pieces of data, and combines together and outputs the rearranged pieces of data.

11. The satellite transceiver according to claim 6, wherein the switching circuitry includes a built-in buffer, and when a transmission rate of data inputted differs from a transmission rate of data outputted, the switching circuitry adjust a difference between the transmission rates, using the built-in buffer.

12. An earth station comprising:
a radio receiving circuitry capable of changing a pointing direction when receiving data from a satellite transceiver including: an encoding circuitry to read generated data from a buffer and encode the data; a modulating circuitry to modulate the encoded data; a radio receiving circuitry capable of changing a pointing direction when receiving data from another satellite transceiver; a switching circuitry to accept, as input, the data modulated by the modulating circuitry or data received by the radio receiving circuitry, and control a data output destination; a plurality of radio transmitting circuitries each capable of changing a pointing direction when transmitting data outputted from the switching circuitries; and a controller to control operation of each circuitry, based on control information generated by a control station according to claim 1;
a demodulating circuitry to demodulate data received by the radio receiving circuitry;
a decoding circuitry to decode the data demodulated by the demodulating circuitry; and
a controller to control at least one or more of the pointing direction of the radio receiving circuitry, a demodulation scheme of the demodulating circuitry, and a decoding scheme of the decoding circuitry, based on control information generated by the control station.

13. A data transmission system comprising:
a control station according to claim 1;
a satellite transceiver including,
an encoding circuit to read generated data from a buffer and encode the data;
a modulating circuit to modulate the encoded data;
radio receiving circuit capable of changing a pointing direction when receiving data from another satellite transceiver;
switching circuit to accept, as input, the data modulated by the modulating circuitry or data received by the radio receiving circuit, and control a data output destination;
a plurality of radio transmitting circuits each capable of changing a pointing direction when transmitting data outputted from the switching circuits; and
a controller to control operation of each circuit, based on control information generated by a control station; and
an earth station including
a radio receiving circuit capable of changing a pointing direction when receiving data from a satellite transceiver including:
an encoding circuitry to read generated data from a buffer and encode the data; a modulating circuitry to modulate the encoded data;
a radio receiving circuit capable of changing a pointing direction when receiving data from another satellite transceiver;
a switching circuit to accept, as input, the data modulated by the modulating circuit or data received by the radio receiving circuit, and control a data output destination;
a plurality of radio transmitting circuits each capable of changing a pointing direction when transmitting data output from the switching circuits; and
a controller to control operation of each circuit, based on control information generated by a control station;
a demodulating circuit to demodulate data received by the radio receiving circuit
a decoding circuit to decode the data demodulated by the demodulating circuit and
a controller to control at least one or more of the pointing direction of the radio receiving circuit, a demodulation scheme of the demodulating circuit, and a decoding scheme of the decoding circuit, based on control information generated by the control station.

14. A data transmission method comprising:

generating, by a control station, control information for satellite transceiver and an earth station in a transmission path determined based on data transmission completion times, to transmit data in the determined transmission path, the data transmission completion times being calculated for one or more transmission paths from a satellite transceiver having generated the data to the earth station, based on communicable times for combinations of a satellite transceiver and an earth station that are capable of communicating with each other and information on a retention state of the data in the satellite transceiver having generated the data;

transmitting, by the satellite transceiver having generated the data, the data by encoding and modulating the generated data and controlling a pointing direction, based on the control information; and receiving, by the earth station, the data by controlling a pointing direction for receiving the data, based on the control information.

15. The data transmission method according to claim 14, further comprising controlling, by a satellite transceiver that relays the data, a pointing direction for receiving the data, based on the control information, to receive the data from the satellite transceiver having generated the data or from a preceding satellite transceiver in the transmission path, and controlling, by the satellite transceiver that relays the data, a pointing direction for transmitting the data, based on the control information, to transmit the data to the earth station or a following satellite transceiver in the transmission path.

* * * * *